US010288958B2

(12) United States Patent
Tang

(10) Patent No.: US 10,288,958 B2
(45) Date of Patent: May 14, 2019

(54) DOUBLE-SIDED DISPLAY DEVICES

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 321 days.

(21) Appl. No.: 14/915,228

(22) PCT Filed: Feb. 25, 2016

(86) PCT No.: PCT/CN2016/074519
§ 371 (c)(1),
(2) Date: Feb. 27, 2016

(87) PCT Pub. No.: WO2017/128462
PCT Pub. Date: Aug. 3, 2017

(65) Prior Publication Data
US 2018/0046011 A1 Feb. 15, 2018

(30) Foreign Application Priority Data

Jan. 29, 2016 (CN) .......................... 2016 1 0064954

(51) Int. Cl.
*G02F 1/1345* (2006.01)
*G02F 1/1335* (2006.01)
(Continued)

(52) U.S. Cl.
CPC ........... *G02F 1/13452* (2013.01); *G02B 6/00* (2013.01); *G02F 1/1339* (2013.01);
(Continued)

(58) Field of Classification Search
CPC ....... G02F 2001/133342; G02F 1/1393; G02F 1/13306; G02F 1/13452; G02F 1/133514;
(Continued)

(56) References Cited

U.S. PATENT DOCUMENTS

2014/0139992 A1* 5/2014 Yang .......................... G06F 1/16
361/679.21
2014/0160365 A1* 6/2014 Kwong ................. G02F 1/1336
349/12

FOREIGN PATENT DOCUMENTS

CN 1553252 A 12/2004
CN 1664659 A 9/2005
(Continued)

*Primary Examiner* — Nathanael R Briggs
*Assistant Examiner* — William D Peterson
(74) *Attorney, Agent, or Firm* — Andrew C. Cheng

(57) ABSTRACT

A double-sided display device includes a first liquid crystal panel for displaying images; a second liquid crystal panel opposite to the first liquid crystal panel, the second liquid crystal panel is configured for displaying the same image with the first liquid crystal panel; a backlight module between the first liquid crystal panel and the second liquid crystal panel, and the backlight module is configured for providing a surface light source to the first liquid crystal panel and the second liquid crystal panel; and wherein the first liquid crystal panel and the second liquid crystal panel share the same driving system. By adopting only one driving system, the first liquid crystal panel and the second liquid crystal panel are controlled to display the same images. The number of the signal input devices and the signal sources may be decreased such that the number of the integrated circuits may also be decreased.

12 Claims, 4 Drawing Sheets

(51) Int. Cl.
*G02F 1/1339* (2006.01)
*G02F 1/1362* (2006.01)
*G02B 6/00* (2006.01)
*G02F 1/1333* (2006.01)

(52) U.S. Cl.
CPC .. *G02F 1/133514* (2013.01); *G02F 1/136286* (2013.01); *G02F 1/133615* (2013.01); *G02F 2001/133342* (2013.01)

(58) Field of Classification Search
CPC ............ G02F 1/1339; G02F 1/136286; G02F 1/133615; G02B 6/00
USPC .......................................................... 349/33
See application file for complete search history.

(56) References Cited

FOREIGN PATENT DOCUMENTS

| | | |
|---|---|---|
| CN | 2862096 Y | 1/2007 |
| CN | 101615367 A | 12/2009 |
| CN | 201594377 U | 9/2010 |
| CN | 104281349 A | 1/2015 |
| CN | 104536201 A | 4/2015 |
| JP | 2005215643 A | 8/2005 |
| JP | 2009157258 A | 7/2009 |

\* cited by examiner

DOUBLE-SIDED DISPLAY DEVICES

BACKGROUND OF THE INVENTION

1. Field of the Invention

The present disclosure relates to double-sided display technology, and more particularly to a double-side display device displaying the same images by one driving system.

2. Discussion of the Related Art

With the technology development, double-sided display devices are needed for a plurality of scenarios, such as communications industry, government window, the financial sector, transport sector, as well as the window industry operating room, such as airports, railway stations, subway stations, canteens and other large flow of people in public places. Thus, the double-sided display devices may be widely adopted in the future.

Usually, the double-sided display device includes two opposite display panels, and each of the display panels is driven by a corresponding driving system. In some scenario, the two display panels have to display the same images at the same time. Under the circumstance, if the two display panels are respectively driven by one driving system, not only the cost may be high, but may also deteriorate the thin and light design. In addition, two or more than two signal input devices and signal sources may be needed.

Thus, it is needed to overcome the above problems.

SUMMARY

In one aspect, a double-sided display device includes: a first liquid crystal panel displaying images; a second liquid crystal panel opposite to the first liquid crystal panel, the second liquid crystal panel is configured for displaying the same image with the first liquid crystal panel; a backlight module between the first liquid crystal panel and the second liquid crystal panel, and the backlight module is configured for providing a surface light source to the first liquid crystal panel and the second liquid crystal panel; and wherein the first liquid crystal panel and the second liquid crystal panel share the same driving system.

Wherein the first liquid crystal panel includes at least: a first color film substrate, a first array substrate opposite to the first color film substrate, a first bonding area, and a first flexible circuit board, wherein one side of the first array substrate extends beyond the first color film substrate to form a first extending end, the first bonding area is arranged on the first extending end, and the first flexible circuit board connects with the first bonding and the driving system.

Wherein the first array substrate includes N number of first data lines and a first data driver, wherein the N number of first data lines extend along a column direction and are spaced apart from each other, the first data driver includes N number of first connecting nodes extending along a row direction in sequence, the i-th first data line connects to the corresponding i-th first connecting node, wherein N is a positive integer and $1 \leq i \leq N$.

Wherein the second liquid crystal panel includes at least: a second array substrate opposite to the first array substrate, a second color film substrate opposite to the second array substrate, a second bonding area and a second flexible circuit board, wherein one side of the second array substrate extends beyond the second color film substrate to form a second extending end, the second bonding area is arranged on the second extending end, and the second flexible circuit board connects the second bonding area and the driving system.

Wherein the second array substrate includes: N number of second data lines and a second data driver, wherein the N number of second data lines are arranged along a column direction and are spaced apart from each other, the second data driver includes N number of second connecting nodes extending along a row direction in sequence, the i-th second data connecting node corresponds to the i-th first connecting node, and the i-th second data line connects to the (N−i+1)-th second connecting node.

Wherein the second array substrate further includes N number of connecting lines, wherein the i-th second data line connects to the (N−i+1)-th second connecting node via the corresponding i-th connecting line.

Wherein the N number of connecting lines are insulated from each other.

Wherein a portion of the N number of connecting lines are wired at a first side of the second data driver, and the remaining portion of the N number of connecting lines are wired at a second side of the second data driver, wherein the first side is opposite to the second side.

Wherein a portion of the N number of connecting lines are wired at the same side of the second data driver.

Wherein when the first data driver provides data signals to the i-th first data line, the second data driver provides the same data signals to the (N−i+1)-th second data line.

In view of the above, by adopting only one driving system, the first liquid crystal panel and the second liquid crystal panel are controlled to display the same images. The number of the signal input devices and the signal sources may be decreased such that the number of the integrated circuits may also be decreased. In this way, the cost is reduced and the double-sided display device may be configured in a thin and light way.

DETAILED DESCRIPTION OF THE EMBODIMENTS

Figure 1:
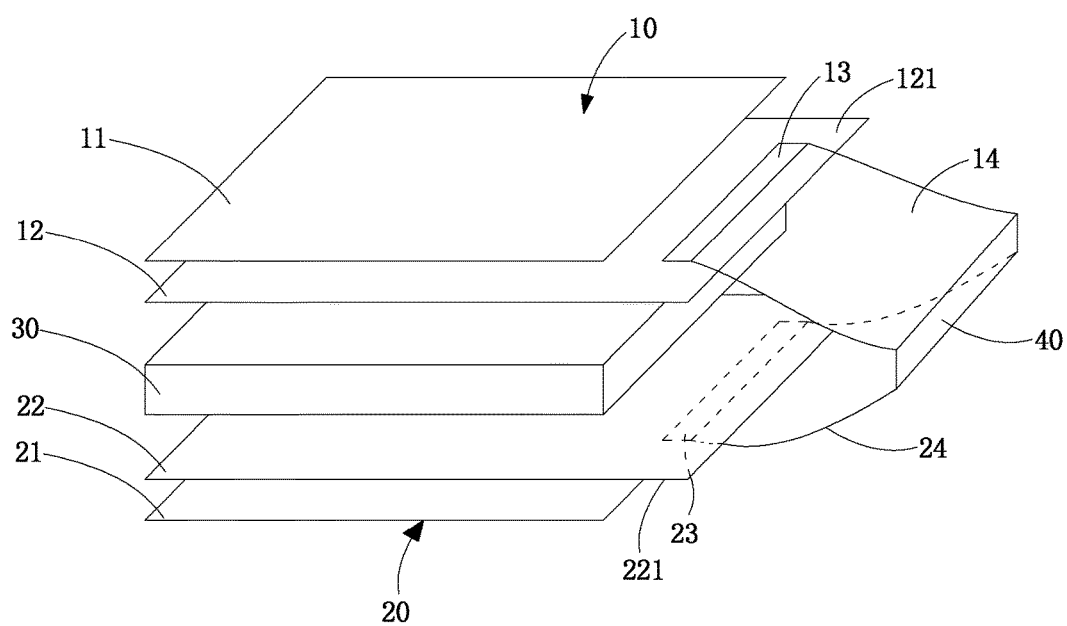
FIG. 1 is a schematic view of the double-sided display device in accordance with a first embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described unnecessary detail.

It should be noted that the relational terms herein, such as "first" and "second", are used only for differentiating one entity or operation, from another entity or operation, which, however do not necessarily require or imply that there should be any real relationship or sequence.

FIG. 1 is a schematic view of the double-sided display device in accordance with a first embodiment.

Referring to FIG. 1, the double-sided display device includes a first liquid crystal panel 10, a second liquid crystal panel 20, a backlight module 30, and a driving system 40.

The first liquid crystal panel 10 is opposite to the second liquid crystal panel 20, and the first liquid crystal panel 10 and the second liquid crystal panel 20 may display the same images at the same time or at different time. In another example, the first liquid crystal panel 10 and the second liquid crystal panel 20 may display the same or different images at the same time or at different time. It is to be noted that the display side of the first liquid crystal panel 10 and the display side of the second liquid crystal panel 20 are back to back. In FIG. 1, the display side of the first liquid crystal panel 10 faces upward, and the display side of the second liquid crystal panel 20 faces downward.

The backlight module 30 is arranged between the first liquid crystal panel 10 and the second liquid crystal panel 20. The backlight module 30 may display an uniform surface light source to the first liquid crystal panel 10 and the second liquid crystal panel 20 at the same or different time. Further, the backlight module 30 may include a light guiding plate, a light source, optical films, and other components, which may be referred to conventional technology.

The driving system 40 is arranged at one side of the first liquid crystal panel 10, the second liquid crystal panel 20, and the backlight module 30. The driving system 40 drives the first liquid crystal panel 10 and the second liquid crystal panel 20. That is, the first liquid crystal panel 10 and the second liquid crystal panel 20 share the driving system 40.

Specifically, the first liquid crystal panel 10 may include, at least, a first color film substrate 11, a first array substrate 12 opposite to the first color film substrate 11, a first bonding area 13, and a first flexible circuit board 14. It is to be noted that the first liquid crystal panel 10 also includes the components necessary for a liquid crystal layer.

The first array substrate 12 is opposite to the first color film substrate 11. In the embodiment, one side of the first array substrate 12 extends beyond the first color film substrate 11 to form a first extending end 121. The first bonding area 13 is arranged on the first extending end 121. The first flexible circuit board 14 connects with the first bonding area 13 and the driving system 40.

Figure 2:
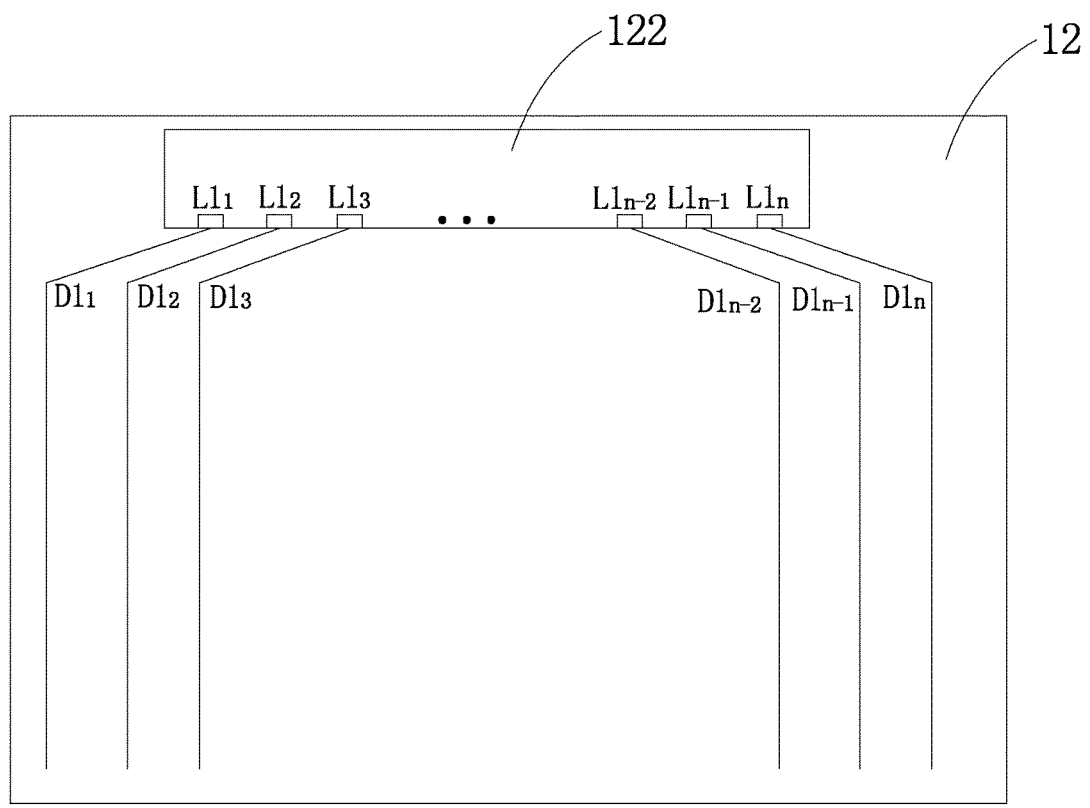
FIG. 2 is a schematic view of the first array substrate in accordance with a first embodiment.

FIG. 2 is a schematic view of the first array substrate in accordance with a first embodiment.

Referring to FIG. 2, the first array substrate 12 may include, at least, n number of first data lines ($D1_1$, $D1_2$, . . . , $D1_n$) and a first data driver 122, wherein n is a positive integer. It is to be noted that the first array substrate 12 may include a timing controller, a gate driver, and other necessary components. Here, the first data driver 122, the timing controller, and the gate driver are connected to the driving system 40 via the first bonding area 13 so as to receive the control signals provided by the driving system 40. It is to be noted that the first data driver 122, the timing controller, and the gate driver may be included in the driving system 40.

Specifically, the n number of first data lines ($D1_1$, $D1_2$, . . . , $D1_n$) extend along a column direction and are spaced apart from each other. The first data driver 122 includes n number of first connecting nodes ($L1_1$, $L1_2$, . . . , $L1_n$) extending along the row direction in sequence, wherein the i-th first data line $D1_i$ (1≤i≤n) connects to the corresponding i-th first connecting node ($L1_i$).

That is, the 1-th first data line ($D1_1$) connects to the 1-th first connecting node ($L1_1$), and 2-th first data line ($D1_2$) connects to the 2-th first connecting node ($L1_2$). Similarly, the n-th first data line ($D1_1$) connects to the n-th first connecting node ($L1_1$).

Referring to FIG. 1, the second liquid crystal panel 20 includes, at least, the second color film substrate 21, a second array substrate 22, a second bonding area 23, and a second flexible circuit board 24. It is to be noted that the second liquid crystal panel 20 also includes the components necessary for a liquid crystal layer.

The second array substrate 22 is opposite to the first array substrate 12, and the second array substrate 22 is arranged below the first array substrate 12. The second color film substrate 21 is opposite to the second array substrate 22, and the second color film substrate 21 is arranged below the second array substrate 22. In the embodiment, one side of the second array substrate 22 extends beyond the second color film substrate 21 to form a second extending end 221. The second bonding area 23 is arranged on the second extending end 221, and the second flexible circuit board 24 connects the second bonding area 23 and the driving system 40.

Figure 3:
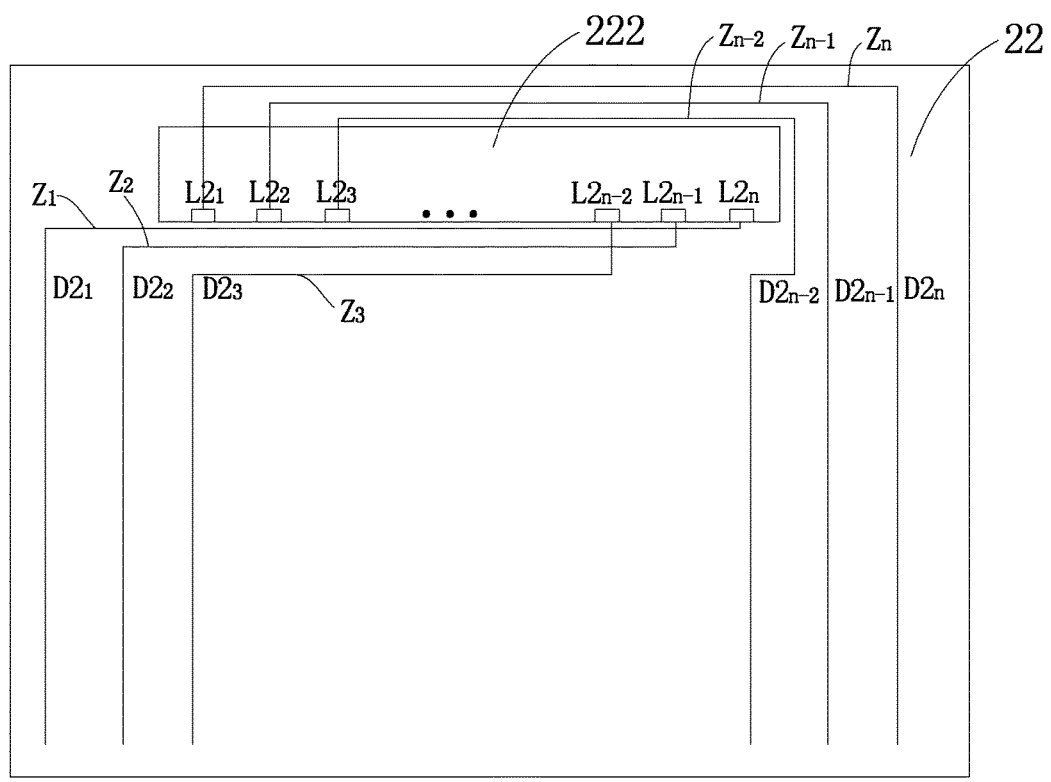
FIG. 3 is a schematic view of the second array substrate in accordance with a first embodiment.

FIG. 3 is a schematic view of the second array substrate in accordance with a first embodiment.

Referring to FIG. 3, the second array substrate 22 may include, at least, n number of second data lines ($D2_1$, $D2_2$, . . . , $D2_n$) and a second data driver 222, wherein n is a positive integer. It is to be noted that the second array substrate 22 may include a timing controller, a gate driver, and other necessary components. Here, the second data driver 122, the timing controller, and the gate driver are connected to the driving system 40 via the second bonding area 23 so as to receive the control signals provided by the driving system 40. It is to be noted that the second data driver 222, the timing controller, and the gate driver may be included in the driving system 40.

Specifically, the n number of second data lines ($D1_1$, $D1_2$, . . . , $D1_n$) extend along a column direction and are spaced apart from each other. The second data driver 222 includes n number of second connecting nodes ($L2_1$, $L2_2$, . . . , $L2_n$) extending along the row direction in sequence, wherein the i-th second data connecting node $L2_i$ (1≤i≤n) corresponds to the i-th first connecting node ($L1_i$), and the i-th second connecting node $L2_i$ and the i-th first connecting node ($L1_i$) connects to the same terminal of the driving system 40. As such, the signals from the same terminal of the driving system 40 are provided to the i-th second connecting node ($L2_i$) and the i-th first connecting node ($L1_i$). The i-th second data line $D2_i$ (1≤i≤n) connects to the (n−i+1)-th second connecting node ($L2_{n-i+1}$). That is, the 1-th second data line ($D2_1$) connects to the n-th second connecting node ($L2_n$), and 2-th second data line ($D2_2$) connects to the (n−1)-th second connecting node ($L2_{n-1}$). Similarly, the (n−1)-th second data line ($D2_{n-1}$) connects to the 2-th second connecting node ($L2_2$), and the n-th second data line ($D2_n$) connects to the 1-th second connecting node ($L2_1$).

Further, referring to FIG. 3, the second array substrate 22 further includes N number of connecting lines ($Z_1$, $Z_2$, . . . , $Z_n$), wherein the i-th second data line (D2) connects to the (n−i+1)-th second connecting node ($L2_{n-i+1}$) via the i-th connecting line ($Z_i$). Here, the connecting line directly connects with the second data line, but the present disclosure is not limited thereto. Further, preferably, the N number of connecting lines ($Z_1$, $Z_2$, . . . , $Z_n$) are insulated from each other, but the present disclosure is not limited thereto.

In one embodiment, a portion of the N number of connecting lines ($Z_1, Z_2, \ldots, Z_n$) are wired at one side of the second data driver 222, and the remaining portion of the N number of connecting lines ($Z_1, Z_2, \ldots, Z_n$) are wired at the other side of the second data driver 222. For instance, in FIG. 3, a portion of the N number of connecting lines ($Z_1, Z_2, \ldots, Z_n$) are wired at an upper side of the second data driver 222, and the remaining portion of the N number of connecting lines ($Z_1, Z_2, \ldots, Z_n$) are wired at lower side of the second data driver 222, but the present disclosure is not limited thereto.

In addition, in real manufacturing process, the intersections of the N number of connecting lines ($Z_1, Z_2, \ldots, Z_n$) may be prevented from being connected via through holes, but the present disclosure is not limited thereto. For instance, the N number of connecting lines ($Z_1, Z_2, \ldots, Z_n$) are not configured on the same layer, and are separated from each other by an insulation layer. However, the i-th connecting line ($Z_i$) connects to the i-th second data line ($D2_i$) and the (n−i+1)-th second connecting node ($L2_{n-i+1}$) at the same layer. Alternatively, a spanning connection is configured at the intersection of two adjacent connecting lines. For instance, the insulation layer is configured at the intersection of the connecting line ($Z_1$) and the connecting line ($Z_2$), and the connecting line ($Z_1$) is configured to be below the insulation layer. The connecting line ($Z_2$) is configured to be above the insulation layer, but the present disclosure is not limited thereto.

Figure 4:
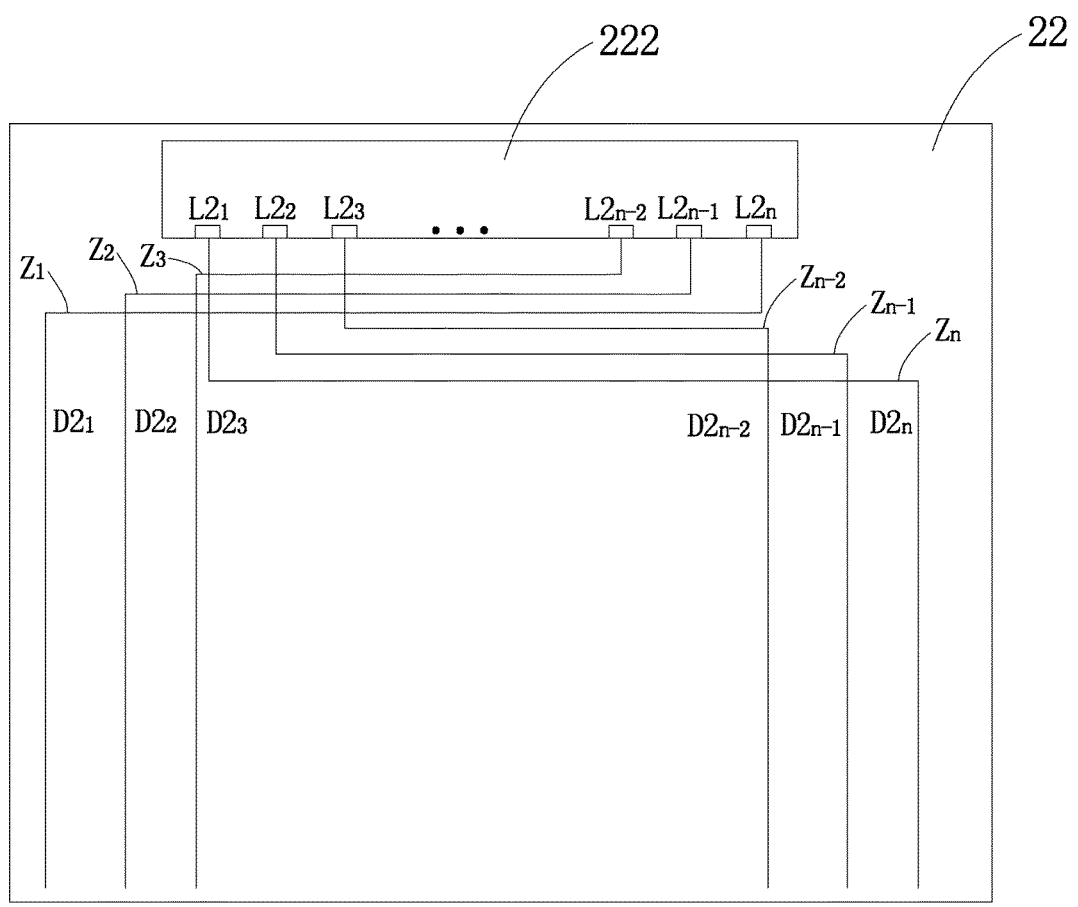
FIG. 4 is a schematic view of second first array substrate in accordance with a second embodiment.

FIG. 4 is a schematic view of second first array substrate in accordance with a second embodiment.

Referring to FIG. 4, the second array substrate 22 may include, at least, n number of second data lines ($D2_1, D2_2, \ldots, D2_n$) and a second data driver 222, wherein n is a positive integer. It is to be noted that the second array substrate 22 may include a timing controller, a gate driver, and other necessary components. Here, the second data driver 122, the timing controller, and the gate driver are connected to the driving system 40 via the second bonding area 23 so as to receive the control signals provided by the driving system 40. It is to be noted that the second data driver 222, the timing controller, and the gate driver may be included in the driving system 40.

Specifically, the n number of second data lines ($D1_1, D1_2, \ldots, D1_n$) extend along a column direction and are spaced apart from each other. The second data driver 222 includes n number of second connecting nodes ($L2_1, L2_2, \ldots, L2_n$) extending along the row direction in sequence, wherein the i-th second data connecting node $L2_i$ (1≤i≤n) corresponds to the i-th first connecting node ($L1_i$), and the i-th second connecting node $L2_i$ and the i-th first connecting node ($L1_i$) connects to the same terminal of the driving system 40. As such, the signals from the same terminal of the driving system 40 are provided to the i-th second connecting node ($L2_i$) and the i-th first connecting node ($L1_i$). The i-th second data line $D2_i$ (1≤i≤n) connects to the (n−i+1)-th second connecting node ($L2_{n-i+1}$). That is, the 1-th second data line ($D2_1$) connects to the n-th second connecting node ($L2_n$), and 2-th second data line ($D2_2$) connects to the (n−1)-th second connecting node ($L2_{n-1}$). Similarly, the (n−1)-th second data line ($D2_{n-1}$) connects to the 2-th second connecting node ($L2_2$), and the n-th second data line ($D2_{n-1}$) connects to the 1-th second connecting node ($L2_1$).

Further, referring to FIG. 3, the second array substrate 22 further includes N number of connecting lines ($Z_1, Z_2, \ldots, Z_n$), wherein the i-th second data line ($D2_i$) connects to the (n−i+1)-th second connecting node ($L2_{n-i+1}$) via the i-th connecting line ($Z_i$). Here, the connecting line directly connects with the second data line, but the present disclosure is not limited thereto. Further, preferably, the N number of connecting lines ($Z_1, Z_2, \ldots, Z_n$) are insulated from each other, but the present disclosure is not limited thereto. In the embodiment, N nu Further, referring to FIG. 3, the second array substrate 22 further includes N number of connecting lines ($Z_1, Z_2, \ldots, Z_n$), wherein the i-th second data line ($D2_i$) connects to the (n−i+1)-th second connecting node ($L2_{n-i+1}$) via the i-th connecting line ($Z_i$). Here, the connecting line directly connects with the second data line, but the present disclosure is not limited thereto. Further, preferably, the N number of connecting lines ($Z_1, Z_2, \ldots, Z_n$) are insulated from each other, but the present disclosure is not limited thereto.

In the embodiment, the N number of connecting lines ($Z_1, Z_2, \ldots, Z_n$) are arranged at the same side of the second data driver 222. In FIG. 4, the N number of connecting lines ($Z_1, Z_2, \ldots, Z_n$) are arranged at the upper side of the second data driver 222. It may be understood that the N number of connecting lines ($Z_1, Z_2, \ldots, Z_n$) may be arranged at the down side of the second data driver 222.

In addition, in real manufacturing process, the intersections of the N number of connecting lines ($Z_1, Z_2, \ldots, Z_n$) may be prevented from being connected via through holes, but the present disclosure is not limited thereto. For instance, the N number of connecting lines ($Z_1, Z_2, \ldots, Z_n$) are not configured on the same layer, and are separated from each other by an insulation layer. However, the i-th connecting line ($Z_i$) connects to the i-th second data line ($D2_i$) and the (n−i+1)-th second connecting node ($L2_{n-i+1}$) at the same layer. Alternatively, a spanning connection is configured at the intersection of two adjacent connecting lines. For instance, the insulation layer is configured at the intersection of the connecting line ($Z_1$) and the connecting line ($Z_2$), and the connecting line ($Z_1$) is configured to be below the insulation layer. The connecting line ($Z_2$) is configured to be above the insulation layer, but the present disclosure is not limited thereto.

As the first liquid crystal panel 10 and the second liquid crystal panel 20 of the double-sided display device may display the same images at the same time, when the first data driver 122 provides the data signals to the i-th first data line ($D1_i$), the second data driver 222 provides the same data signals to the i-th second data line ($D2_i$). In this way, the first liquid crystal panel 10 and the second liquid crystal panel 20 are kept on displaying the same images, instead of images inverted by 180 degrees along a left-right direction.

In view of the above, by adopting only one driving system, the first liquid crystal panel and the second liquid crystal panel are controlled to display the same images. The number of the signal input devices and the signal sources may be decreased such that the number of the integrated circuits may also be decreased. In this way, the cost is reduced and the double-sided display device may be configured in a thin and light way.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A double-sided display device, comprising:
a first liquid crystal panel displaying images;

a second liquid crystal panel opposite to the first liquid crystal panel, the second liquid crystal panel is configured for displaying the same image with the first liquid crystal panel;

a backlight module between the first liquid crystal panel and the second liquid crystal panel, and the backlight module is configured for providing a surface light source to the first liquid crystal panel and the second liquid crystal panel; and wherein the first liquid crystal panel and the second liquid crystal panel share the same driving system;

wherein the first liquid crystal panel comprises at least:

a first color film substrate, a first array substrate opposite to the first color film substrate, a first bonding area, and a first flexible circuit board, wherein one side of the first array substrate extends beyond the first color film substrate to form a first extending end, the first bonding area is arranged on the first extending end, and the first flexible circuit board connects with the first bonding and the driving system;

wherein the second liquid crystal panel comprises at least:

a second array substrate opposite to the first array substrate, a second color film substrate opposite to the second array substrate, a second bonding area and a second flexible circuit board, wherein one side of the second array substrate extends beyond the second color film substrate to form a second extending end, the second bonding area is arranged on the second extending end, and the second flexible circuit board connects the second bonding area and the driving system;

wherein the second array substrate comprises:

N number of second data lines and a second data driver, wherein the N number of second data lines are arranged along column direction and are spaced apart from each other, the second data driver comprises N number of second connecting nodes extending along a row direction in sequence, the i-th second data connecting node corresponds to the i-th first connecting node, and the i-th second data line connects to the (N−i+1)-th second connecting node.

2. The double-sided display device as claimed in claim 1, wherein the first array substrate comprises N number of first data lines and a first data driver, wherein the N number of first data lines extend along a column direction and are spaced apart from each other, the first data driver comprises N number of first connecting nodes extending along a row direction in sequence, the i-th first data line connects to the corresponding i-th first connecting node, wherein N is a positive integer and 1≤i≤N.

3. The double-sided display device as claimed in claim 1, wherein the second array substrate further comprises N number of connecting lines, wherein the i-th second data line connects to the (N−i+1)-th second connecting node via the corresponding i-th connecting line.

4. The double-sided display device as claimed in claim 2, wherein the second array substrate further comprises N number of connecting lines, wherein the i-th second data line connects to the (N−i+1)-th second connecting node via the corresponding i-th connecting line.

5. The double-sided display device as claimed in claim 3, wherein the N number of connecting lines are insulated from each other.

6. The double-sided display device as claimed in claim 4, wherein the N number of connecting lines are insulated from each other.

7. The double-sided display device as claimed in claim 3, wherein a portion of the N number of connecting lines are wired at a first side of the second data driver, and the remaining portion of the N number of connecting lines are wired at a second side of the second data driver, wherein the first side is opposite to the second side.

8. The double-sided display device as claimed in claim 4, wherein a portion of the N number of connecting lines are wired at a first side of the second data driver, and the remaining portion of the N number of connecting lines are wired at a second side of the second data driver, wherein the first side is opposite to the second side.

9. The double-sided display device as claimed in claim 3, wherein a portion of the N number of connecting lines are wired at the same side of the second data driver.

10. The double-sided display device as claimed in claim 4, wherein a portion of the N number of connecting lines are wired at the same side of the second data driver.

11. The double-sided display device as claimed in claim 1, wherein when the first data driver provides data signals to the i-th first data line, the second data driver provides the same data signals to the (N−i+1)-th second data line.

12. The double-sided display device as claimed in claim 2, wherein when the first data driver provides data signals to the i-th first data line, the second data driver provides the same data signals to the (N−i+1)-th second data line.

* * * * *